(12) United States Patent
Ishitobi

(10) Patent No.: US 11,531,689 B2
(45) Date of Patent: Dec. 20, 2022

(54) INFORMATION PROCESSING APPARATUS, INFORMATION PROCESSING METHOD, AND NON-TRANSITORY COMPUTER READABLE MEDIUM

(71) Applicant: FUJIFILM BUSINESS INNOVATION CORP., Tokyo (JP)

(72) Inventor: Yasuhiro Ishitobi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 166 days.

(21) Appl. No.: 16/871,394

(22) Filed: May 11, 2020

(65) Prior Publication Data

US 2020/0272642 A1 Aug. 27, 2020

Related U.S. Application Data

(63) Continuation of application No. 15/331,279, filed on Oct. 21, 2016, now Pat. No. 10,956,452.

(30) Foreign Application Priority Data

Jun. 21, 2016 (JP) .................................. 2016-122198

(51) Int. Cl.
*G06F 16/00* (2019.01)
*G06F 16/28* (2019.01)
*G06F 16/2457* (2019.01)
*G06F 16/335* (2019.01)
*G06F 21/62* (2013.01)

(52) U.S. Cl.
CPC ...... *G06F 16/285* (2019.01); *G06F 16/24578* (2019.01); *G06F 16/335* (2019.01); *G06F 21/6254* (2013.01); *G06F 2221/2101* (2013.01)

(58) Field of Classification Search
CPC ........... G06F 17/30867; G06F 17/3053; G06F 17/30616; G06F 21/31; G06F 19/00; G06F 19/325; G06F 19/3456; G06F 19/3481; G06F 17/30861; G06F 17/30864; G06F 15/16; G06F 3/0482
See application file for complete search history.

(56) References Cited

U.S. PATENT DOCUMENTS

| | | | |
|---|---|---|---|
| 7,249,123 B2 | 7/2007 | Elder et al. |
| 8,321,462 B2 | 11/2012 | Nance et al. |
| 8,856,250 B2 | 10/2014 | Jayaram et al. |
| 8,868,651 B2 | 10/2014 | Roman et al. |

(Continued)

FOREIGN PATENT DOCUMENTS

| | | | |
|---|---|---|---|
| JP | 2002-245212 A | 8/2002 |
| JP | 2003-281069 A | 10/2003 |

(Continued)

OTHER PUBLICATIONS

Dec. 31, 2018 Office Action issued in U.S. Appl. No. 15/331,279.

(Continued)

*Primary Examiner* — Yicun Wu
(74) *Attorney, Agent, or Firm* — Oliff PLC

(57) ABSTRACT

An information processing apparatus includes an extraction unit and a generation unit. The extraction unit extracts a common topic from profiles of plural users. The generation unit generates a community including users who are associated with the topic extracted by the extraction unit.

3 Claims, 5 Drawing Sheets

(56) References Cited

U.S. PATENT DOCUMENTS

| | | | |
|---|---|---|---|
| 9,058,331 B2 * | 6/2015 | Graham | G06F 16/438 |
| 9,438,691 B1 | 9/2016 | Andrews et al. | |
| 2006/0036456 A1 | 2/2006 | Wu | |
| 2006/0156337 A1 | 7/2006 | Thelen et al. | |
| 2006/0271564 A1 | 11/2006 | Meng Muntz et al. | |
| 2008/0104079 A1 | 5/2008 | Craig | |
| 2008/0114847 A1 | 5/2008 | Ma et al. | |
| 2009/0070128 A1 | 3/2009 | McCauley et al. | |
| 2009/0327232 A1 | 12/2009 | Carter et al. | |
| 2010/0306708 A1 | 12/2010 | Trenz et al. | |
| 2012/0016837 A1 | 1/2012 | Matsuda et al. | |
| 2012/0054645 A1 | 3/2012 | Hoomani et al. | |
| 2012/0109980 A1 | 5/2012 | Strauss et al. | |
| 2013/0325945 A1 | 12/2013 | Jayaram et al. | |
| 2015/0046444 A1 | 2/2015 | Afkhami | |
| 2015/0331865 A1 | 11/2015 | Bank et al. | |
| 2016/0012053 A1 | 1/2016 | Weening et al. | |
| 2016/0246869 A1 * | 8/2016 | Gadamsetty | G06F 16/21 |
| 2017/0103402 A1 | 4/2017 | El-Diraby et al. | |

FOREIGN PATENT DOCUMENTS

| | | |
|---|---|---|
| JP | 2005-209003 A | 8/2005 |
| JP | 2009-157864 A | 7/2009 |

OTHER PUBLICATIONS

Jun. 17, 2019 Office Action issued in U.S. Appl. No. 15/331,279.
Oct. 3, 2019 Office Action issued in U.S. Appl. No. 15/331,279.
Mar. 17, 2020 Office Action issued in Japanese Patent Application No. 2016-122198.
Proposal of Technology for Chestnut HARA, Shun * and User Profile Automatic Updating to Forget, 72nd (Heisei 22 (2010)) National Conference Lecture Collected-Papers (1) Architecture Software Science and Engineering Database, Media, Information Processing Society of Japan, Mar. 8, 2010, p. I-609 to I-610, 4C-4.
Feb. 19, 2020 Office Action issued in U.S. Appl. No. 15/331,279.
Nov. 16, 2020 Notice of Allowance issued in U.S. Appl. No. 15/331,279.
Jun. 25, 2020 Office Action issued in U.S. Appl. No. 15/331,279.

* cited by examiner

FIG. 5

| 505 | 510 | 515 | 520 | 525 | 530 | 535 |
|---|---|---|---|---|---|---|
| ID | NAME | email | DEPARTMENT | BIRTHPLACE | SPECIALTY | QUALIFICATION |
| 1 | TARO FUJI | Fuji.Taro@sss.co.jp | ABC DEVELOPMENT DEPARTMENT | YOKOHAMA-SHI, KANAGAWA | DATABASE | EIKEN GRADE 1, SYSTEM |
| ... | | | | | | |
| 50 | HANAKO YAMADA | Yamada.H@sss.co.jp | ACCOUNTING DEPARTMENT | SHINAGAWA-KU, TOKYO | | BOOK-KEEPING TEST |
| ... | | | | | | |

| 540 | 545 | 550 | 555 |
|---|---|---|---|
| ASSIGNED PRODUCT | ASSIGNED PRODUCT CHANGE DATE AND TIME | INTEREST | INTEREST CHANGE DATE AND TIME |
| DOCUMENT MANAGEMENT SYSTEM | | FISHING, MUSIC | |
| | | TEA CEREMONY, MUSIC | |
| ... | ... | | ... |

500

| KEYWORD | DF | TF | TF·IDF |
|---|---|---|---|
| Keyword786 | 8 | 345 | 43.13 |
| ... | | | |
| Keyword6 | 78 | 655 | 8.40 |
| Keyword383 | 32 | 223 | 6.97 |
| ... | | | |
| Keyword88 | 24 | 134 | 5.58 |
| Keyword105 | 234 | 674 | 2.88 |
| Keyword1143 | 263 | 452 | 1.72 |
| Keyword1053 | 972 | 1435 | 1.48 |
| Keyword943 | 545 | 784 | 1.44 |
| Keyword411 | 562 | 732 | 1.30 |
| Keyword2007 | 1000 | 1000 | 1.00 |
| ... | | | |

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is a continuation of U.S. application Ser. No. 15/331,279, filed Oct. 21, 2016, which in turn is based on and claims priority under 35 USC 119 from Japanese Patent Application No. 2016-122198, filed Jun. 21, 2016.

BACKGROUND

Technical Field

The present invention relates to an information processing apparatus, an information processing method, and a non-transitory computer readable medium.

SUMMARY

According to an aspect of the invention, there is provided an information processing apparatus including an extraction unit and a generation unit. The extraction unit extracts a common topic from profiles of plural users. The generation unit generates a community including users who are associated with the topic extracted by the extraction unit.

BRIEF DESCRIPTION OF THE DRAWINGS

Exemplary embodiments of the present invention will be described in detail based on the following figures, wherein:

FIG. 5 is an explanatory diagram illustrating an example of a data structure of a user profile table;

DETAILED DESCRIPTION

Hereinafter, exemplary embodiments of the present invention will be described with reference to the drawings.

Figure 1:
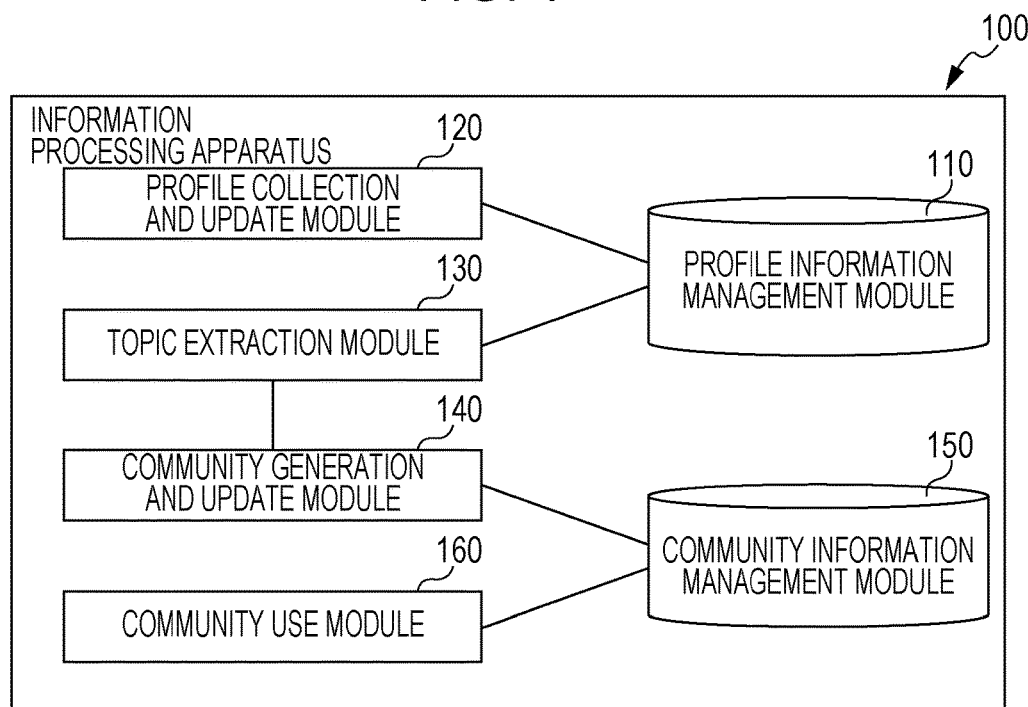
FIG. 1 is a conceptual module configuration diagram of an example of a configuration according to an exemplary embodiment.

FIG. 1 is a conceptual module configuration diagram illustrating an example of a configuration according to an exemplary embodiment.

In general, the term "module" refers to a component such as software (a computer program), hardware, or the like, which may be logically separated. Therefore, a module in an exemplary embodiment refers not only to a module in a computer program but also to a module in a hardware configuration. Accordingly, through an exemplary embodiment, a computer program for causing the component to function as a module (a program for causing a computer to perform each step, a program for causing a computer to function as each unit, and a program for causing a computer to perform each function), a system, and a method are described. However, for convenience of description, the terms "store", "cause something to store", and other equivalent expressions will be used. When an exemplary embodiment relates to a computer program, the terms and expressions represent "causing a storing unit to store", or "controlling a storing unit to store". A module and a function may be associated on a one-to-one basis. In the actual implementation, however, one module may be implemented by one program, multiple modules may be implemented by one program, or one module may be implemented by multiple programs. Furthermore, multiple modules may be executed by one computer, or one module may be executed by multiple computers in a distributed computer environment or a parallel computer environment. Moreover, a module may include another module. In addition, hereinafter, the term "connection" may refer to logical connection (such as data transfer, instruction, and cross-reference relationship between data) as well as physical connection. The term "being predetermined" represents being set prior to target processing being performed. "Being predetermined" represents not only being set prior to processing in an exemplary embodiment but also being set even after the processing in the exemplary embodiment has started, in accordance with the condition and state at that time or in accordance with the condition and state during a period up to that time, as long as being set prior to the target processing being performed. When there are plural "predetermined values", the values may be different from one another, or two or more values (obviously, including all the values) may be the same. The term "in the case of A, B is performed" represents "a determination as to whether it is A or not is performed, and when it is determined to be A, B is performed", unless the determination of whether it is A or not is not required.

Moreover, a "system" or an "apparatus" may be implemented not only by multiple computers, hardware, apparatuses, or the like connected through a communication unit such as a network (including a one-to-one communication connection), but also by a single computer, hardware, apparatus, or the like. The terms "apparatus" and "system" are used as synonymous terms. Obviously, the term "system" does not include social "mechanisms" (social system), which are only artificially arranged.

Furthermore, for each process in a module or for individual processes in a module performing plural processes, target information is read from a storing unit and a processing result is written to the storing unit after the process is performed. Therefore, the description of reading from the storing unit before the process is performed or the description of writing to the storing unit after the process is performed may be omitted. The storing unit may be a hard disk, a random access memory (RAM), an external storage medium, a storing unit using a communication line, a register within a central processing unit (CPU), or the like.

An information processing apparatus 100 according to an exemplary embodiment generates a community. The information processing apparatus 100 includes, as illustrated in FIG. 1, a profile information management module 110, a profile collection and update module 120, a topic extraction module 130, a community generation and update module 140, a community information management module 150, and a community use module 160.

A community is a group of plural users and is formed on a computer for the purpose of communication with other users. For example, a group in a bulletin board system (BBS) or a social network service (SNS) or the like corresponds to a community.

The profile collection and update module 120 is connected to the profile information management module 110. The profile collection and update module 120 collects a profile of a user (for example, may also be referred to as personal information), and registers the profile with the profile information management module 110. Furthermore, the profile collection and update module 120 updates a profile registered with the profile information management module 110.

A profile may be registered manually or an activity of a user may be monitored and registered automatically. For example, a word used for generation of a document, a search word, or a word in a document browsed may be extracted.

The profile information management module 110 is connected to the profile collection and update module 120 and the topic extraction module 130. The profile information management module 110 stores a profile of a user.

The profile may include static information of a user, which is fixed information, and dynamic information of the user, which is variable information.

The profile may include variable dynamic information of a user.

The profile may include fixed static information of a user.

Static information is, for example, information indicating personal attributes based on a long-term point of view, such as age, sex, background, literary work, qualification, department, group, and the like. Dynamic information is, for example, information of what a user is handling actively, such as a current interest, an assigned product, an assigned duty, a word used for generation of a document, and the like. The "current" may include the last several days, the last week, the last month, or the like.

The topic extraction module 130 is connected to the profile information management module 110 and the community generation and update module 140. The topic extraction module 130 extracts a common topic from profiles of plural users. Specifically, based on profiles managed at the profile information management module 110, the topic extraction module 130 extracts a common topic among plural users.

Furthermore, the topic extraction module 130 may extract a common topic by performing weighting of the appearance frequency of a word used in static information and dynamic information. A weight of static information may be different from a weight of dynamic information.

The topic extraction module 130 may extract a common topic according to the appearance frequency of a word used in dynamic information.

The topic extraction module 130 may extract a common topic according to the appearance information of a word used in static information.

The community generation and update module 140 is connected to the topic extraction module 130 and the community information management module 150. The community generation and update module 140 generates a community including a user associated with a topic extracted by the topic extraction module 130. Specifically, the community generation and update module 140 automatically generates a community including a user (associated user) associated with a topic extracted by the topic extraction module 130 as a member, and registers the community with the community information management module 150.

Upon generation of the community, the member is notified of the generation of the community. In the case where a new associated user associated with an existing topic is extracted by the topic extraction module 130, the community generation and update module 140 may update associated users of the existing community and notify members of the community of the update.

The community generation and update module 140 may register a user belonging to a community in such a manner that the user is disclosed as an anonymous user.

In the case where the amount of update of dynamic information is equal to or more than a predetermined threshold, the community generation and update module 140 may generate a community.

In the case where static information is updated, the community generation and update module 140 may generate a community.

The community information management module 150 is connected to the community generation and update module 140 and the community use module 160. The community information management module 150 manages a community generated by the community generation and update module 140. The community information management module 150 manages a disclosure target of personal information of an associated user forming a community. A disclosure target may be, for example, a name, a department, an email address, and the like. At the time of generating a community, information which is able to identify an individual may not be disclosed.

The community use module 160 is connected to the community information management module 150. The community use module 160 provides a way of communication for a community managed at the community information management module 150. For example, a way of communication may be implemented by using an existing technology such as a bulletin board system for collaboration.

Figure 2:
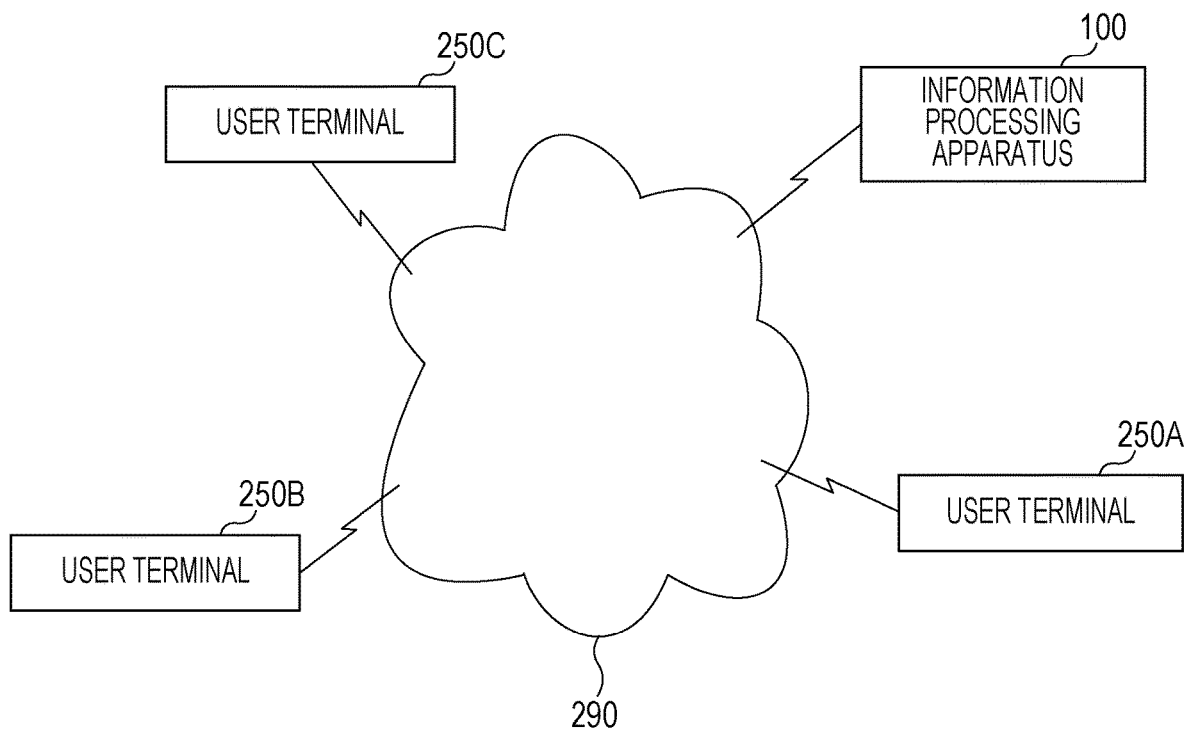
FIG. 2 is an explanatory diagram illustrating an example of a system configuration using an exemplary embodiment.

FIG. 2 is an explanatory diagram illustrating an example of a system configuration according to an exemplary embodiment.

The information processing apparatus 100, a user terminal 250A, a user terminal 250B, and a user terminal 250C are connected to one another via a communication line 290. The communication line 290 may be a wireless communication line, a wired communication line, or a combination of wireless and wired communication lines. The communication line 290 may be, for example, the Internet, an intranet, or the like as a communication infrastructure. Furthermore, functions of the information processing apparatus 100 may be implemented as a cloud service. The user terminals 250 may be desktop personal computers (PCs), notebook PCs, tablet terminals, portable terminals (including smartphones), or the like. Each user performs registration of a profile or an operation for a document or the like using the user terminal 250, and performs activities (writing, reading, and the like of information) in a community generated by the information processing apparatus 100.

Figure 3:
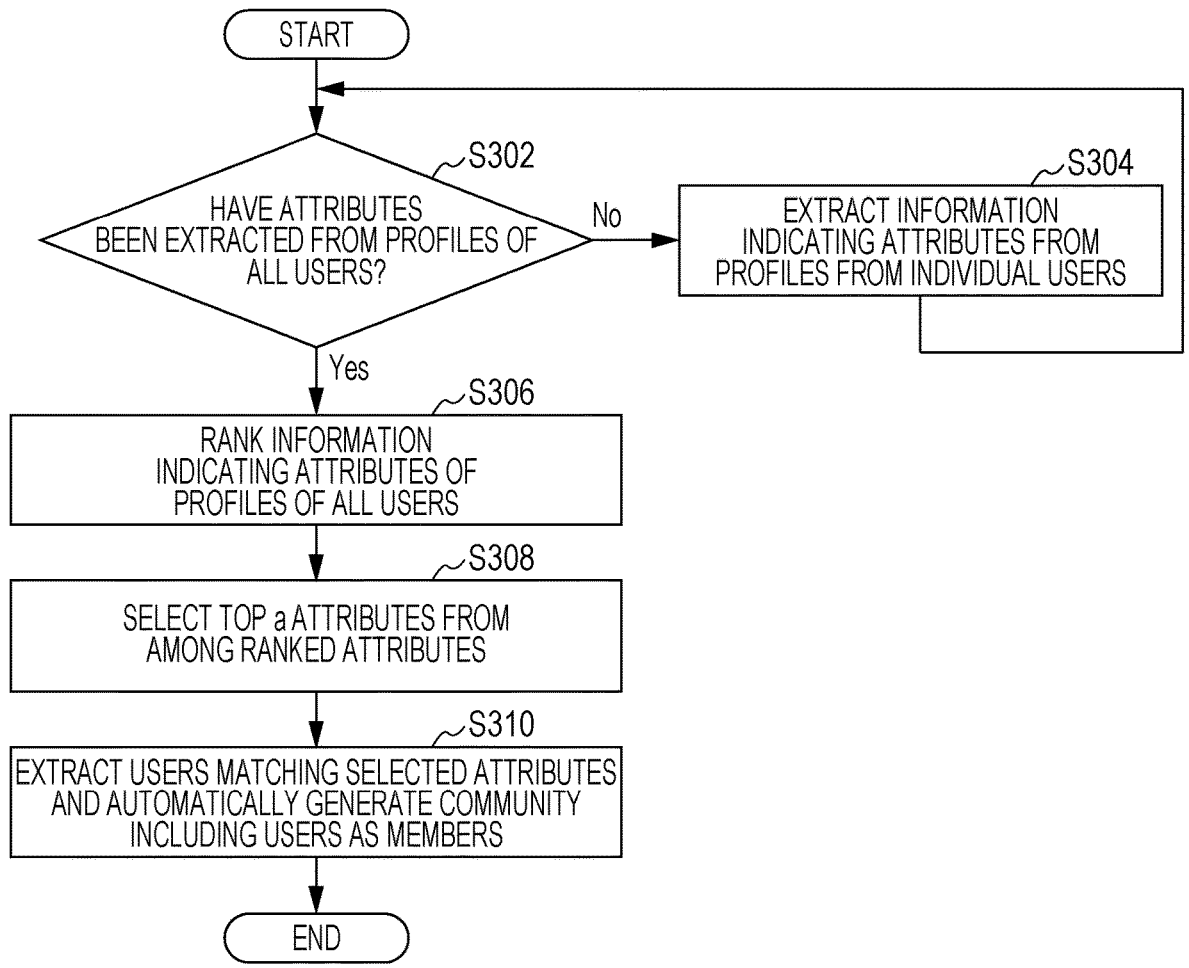
FIG. 3 is a flowchart illustrating an example of a process according to an exemplary embodiment.

FIG. 3 is a flowchart illustrating an example of a process according to an exemplary embodiment. The process illustrated in FIG. 3 is an example of a process for automatically generating a community based on a profile of a user.

In step S302, it is determined whether or not attributes (for example, keywords etc.) have been extracted from profiles of all the users. In the case where attributes have been extracted from profiles of all the users, the process proceeds to step S306. In the case where attributes have not been extracted from profiles of all the users, the process proceeds to step S304.

In step S304, information indicating attributes is extracted from profiles of individual users. Then, the process returns to step S302. That is, attributes of profiles of individual users are extracted from the profile information management module 110. The attributes to be extracted include, for example, a keyword.

In step S306, the information indicating the attributes of the profiles of all the users are ranked. For example, weighting is performed on the attributes extracted from the profiles of all the users, and the attributes are ranked according to the weights. For example, a logic like term frequency-inverse document frequency (TF·IDF) is used for weighting (although TF·IDF itself is not used). In this example, a keyword indicating an attribute is represented by Term, and the appearance frequency of a Term in profiles of all the users is represented by TF. Furthermore, a profile of a user is regarded as a Document, and the number of users for which the Term appears is regarded as DF. Accordingly, TF·IDF=TF/DF is calculated for individual attributes, and the attributes are ranked in descending order.

In step S308, top a attributes are selected from among the ranked attributes.

In step S310, users matching the selected attributes are extracted, and a community including the extracted users as members is automatically generated. That is, users whose profiles include the top a attributes in the ranking are extracted, and a community including the users as members is generated.

By executing the process illustrated as the flowchart of the example of FIG. 3 in a repetitive manner at following timing, a community may be generated:

Execute the process periodically (for every predetermined period);

Execute the process at an update time (immediately after update) of a user profile (static information); and Execute the process when the amount of update of a user profile (dynamic information) is (equal to or) more than a predetermined threshold.

The amount of update and a threshold may include following patterns:

Case where X percent or more of all the users update their profiles;

Case where information of X percent or more of profiles of all the users is updated; and Case where the number of times profiles are updated exceeds the statistical number of times a profile is updated per user, where the statistical number of times update is performed may be the average value, median value, mode value, and the like of the number of update times.

Figure 4:
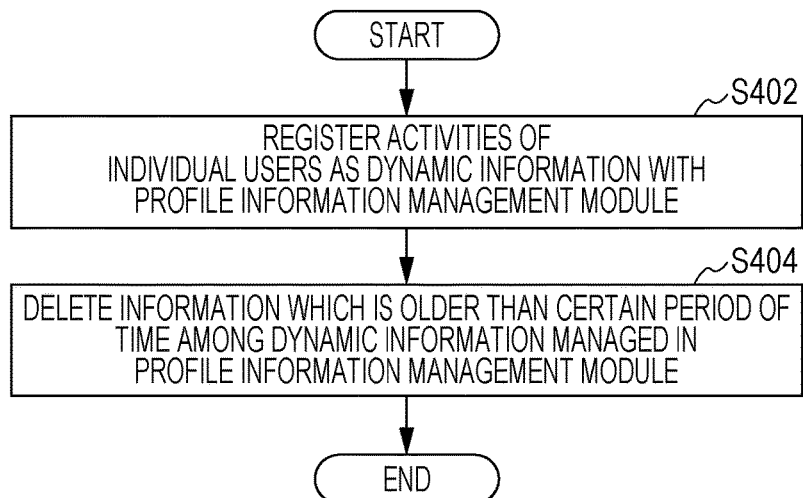
FIG. 4 is a flowchart illustrating an example of a process according to an exemplary embodiment.

FIG. 4 is a flowchart illustrating an example of a process according to an exemplary embodiment. The process illustrated in FIG. 4 is an example of a process for managing dynamic information as a user profile.

In step S402, activities of individual users are registered as dynamic information with the profile information management module 110. For example, an operation history of each user is collected. For example, operations for email transmission, document generation, document registration with various systems, message registration, and the like are to be collected. A document content, a message, a sentence or a keyword extracted from the document content or message, and the like are managed as user profile information. The date and time (year, month, date, hour, minutes, seconds, units smaller than seconds, or a combination of the above) that the operation was performed may be registered along with the activities.

In step S404, among dynamic information managed at the profile information management module 110, information which is older than a certain period of time (predetermined period of time) is deleted. Accordingly, only the up-to-date activity of each user is managed as dynamic information.

In the case where a community is automatically generated using dynamic information as a profile of a user, an operation described below is performed.

In the process illustrated in FIG. 3, in step S304, attributes of individual users are extracted based on only dynamic information. In the other processing steps, the explanation provided for the flowchart illustrated in FIG. 3 is applied.

In the case where only dynamic information is used, a community of an up-to-date topic may be automatically generated.

Dynamic information changes with time. Therefore, it is appropriate to perform automatic generation of a community "when the amount of update of user profile information exceeds a threshold" or "periodically".

In the case where a community is automatically generated using static information as a profile of a user, an operation described below is performed.

In the process illustrated in FIG. 3, in step S304, attributes of individual users are extracted based on only static information. In the other processing steps, the explanation provided for the flowchart illustrated in FIG. 3 is applied.

In the case where only static information is used, a long-term community such as an organization may be automatically generated.

Normally, there is less change in static information. Therefore, it is appropriate to perform automatic generation of a community "at an update time (immediately after update) of user profile information".

In the case where a community is automatically generated using static information and dynamic information as a profile of a user, an operation described below is performed.

In the case where a combination of static information and dynamic information is used, there is less change in the static information compared to the dynamic information. Therefore, attributes extracted from the static information and the dynamic information need to be used in such a manner that weighting is performed on the static information. For example, weighting of a keyword may be separately performed for the static information and the dynamic information. After normalization of the weights, merging may be performed.

FIG. 5 is an explanatory diagram illustrating an example of a data structure of a user profile table 500. The user profile table 500 is stored in the profile information management module 110 and is generated by the profile collection and update module 120.

The user profile table 500 includes an identification (ID) field 505, a name field 510, an email field 515, a department field 520, a birthplace field 525, a specialty field 530, a qualification field 535, an assigned product field 540, an assigned product change date and time field 545, an interest field 550, and an interest change date and time field 555. In the ID field 505, in an exemplary embodiment, information (ID) for uniquely identifying a user is stored. In the name field 510, the name of the user is stored. In the email field 515, the email address of the user is stored. In the department field 520, a department the user belongs to is stored. In the birthplace field 525, the birthplace of the user is stored. In the specialty field 530, a specialty of the user is stored. In the qualification field 535, a qualification that the user has is stored. In the assigned product field 540, a product assigned to the user is stored. In the assigned product change date and time field 545, the date and time that the user is assigned with the product is stored. In the interest field 550, an interest of the user is stored. In the interest change date and time field 555, the date and time that the user comes to have the interest is stored.

The profile collection and update module 120 collects information in accordance with acquisition from personnel information or registration of individuals, and generates the user profile table 500. In addition to this, the profile collection and update module 120 may extract, based on an operation history of a user (an email, a document management system, an operation via a system such as a blog, and the contents thereof), information that the user accesses, and reflect the extracted information in the user profile table 500.

Furthermore, only a keyword extracted from collected information may be eventually stored in the user profile table 500. Alternatively, a keyword and the use frequency of the keyword may be stored. Furthermore, use date and time information of a keyword may also be stored.

Figures 6, 7:
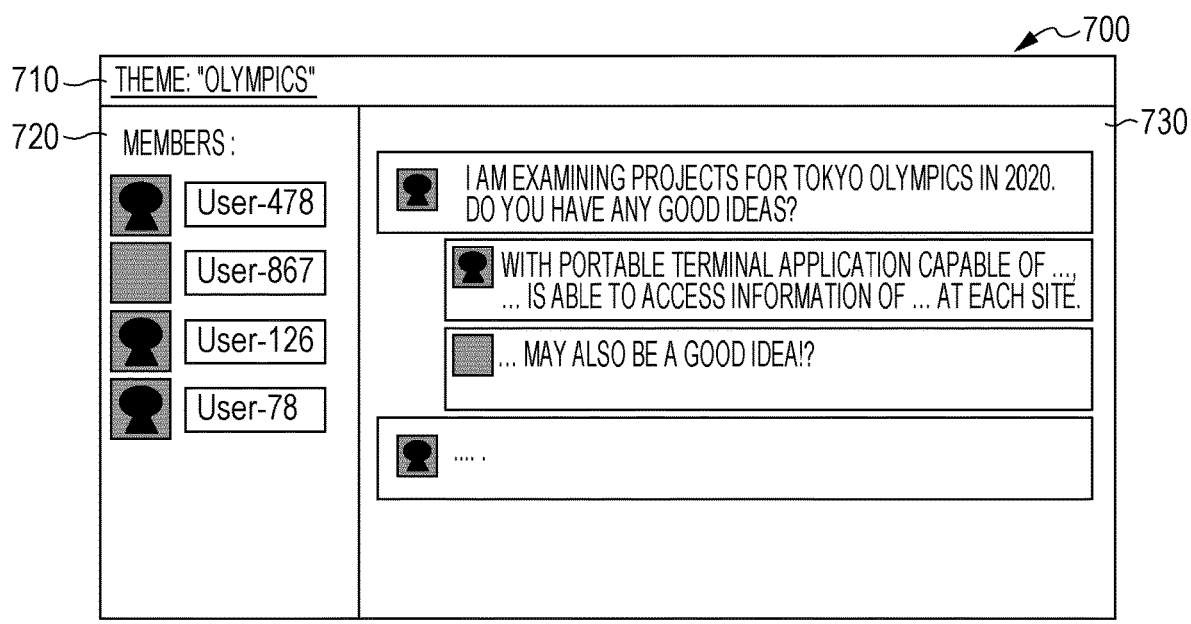
FIG. 6 is an explanatory diagram illustrating an example of a data structure of a keyword and weighting table.
FIG. 7 is an explanatory diagram illustrating an example of a process according to an exemplary embodiment.

Based on the collected information of the user profile table 500, weights of individual keywords are calculated, as illustrated in an example of FIG. 6, and a characteristic keyword is extracted. The entire profile may be used or only keywords used in the last certain period of time may be used. FIG. 6 is an explanatory diagram illustrating an example of a data structure of a keyword and weighting table 600. The keyword and weighting table 600 includes a keyword field 605, a DF field 610, a TF field 615, and a TF·IDF field 620. In the keyword field 605, a keyword is stored. A set of keywords (multiple keywords) may be stored in the keyword field 605. A keyword may be extracted from the user profile table 500. In the DF field 610, a DF is stored. As described above, a DF represents the number of users who use the keyword (the number of users who have the keyword in the user profile table 500). In the TF field 615, a term frequency (TF) is stored. As described above, a TF represents the appearance frequency of the keyword in profiles of all the users (the number of appearance times of the keyword in the user profile table 500). In the TF·IDF field 620, a TF-inverse document frequency (TF·IDF) is stored. As described above, a TF·IDF represents a value obtained by dividing a value in the TF field 615 by a value in the DF field 610.

As described above, a keyword which has not been used for generating a community is extracted in descending order of weighted keywords, and is defined as a theme (subject) of a community. Then, a user who is associated with the keyword (specifically, a user whose user profile table 500 includes the keyword) is extracted as a member of the community. At this time, in the case where the corresponding keyword appears once or more in a profile of a user, the user is extracted as a member. Alternatively, a member may be set in descending order of use frequency.

Furthermore, a weight of static information may be different from a weight of dynamic information. For example, the weight of static information may be larger than the weight of dynamic information. This is because in general static information is often used only once in the user profile table 500. In the case where a keyword in the keyword field 605 of the keyword and weighting table 600 illustrated in the example of FIG. 6 is static information, the value in the DF field 610 may be decreased in a predetermined method. As the predetermined method, for example, a predetermined value (a value larger than 0) may be subtracted from the value in the DF field 610 or the value in the DF field 610 may be divided by a predetermined value (a value larger than 1). The value in the TF field 615 may be increased in a predetermined method. As the predetermined method, for example, a predetermined value (a value larger than 0) may be added to the value in the TF field 615 or the value in the TF field 615 may be multiplied by a predetermined value (a value larger than 1). In contrast, in the case where a keyword in the keyword field 605 is dynamic information, the value in the DF field 610 may be increased in a predetermined method. As the predetermined method, for example, a predetermined value (a value larger than 0) may be added to the value in the DF field 610 or the value in the DF field 610 may be multiplied by a predetermined value (a value larger than 1). The value in the TF field 615 may be decreased in a predetermined method. As the predetermined method, for example, a predetermined value (a value larger than 0) may be subtracted from the value in the TF field 615 or the value in the TF field 615 may be divided by a predetermined value (a value larger than 1).

FIG. 7 is an explanatory diagram illustrating an example of a process according to an exemplary embodiment. The diagram illustrated in FIG. 7 is an example of a bulletin board of a community generated by collecting four members for a theme "Olympics".

In a bulletin board screen 700, a theme field 710, a member field 720, and a comment region 730 are displayed. In the theme field 710, a theme is indicated. In the member field 720, a member (user) of a community is indicated. In the comment region 730, exchange of information among members is indicated. The theme indicated in the theme field 710 is a keyword which is ranked as a top keyword in the TF·IDF field 620 of the keyword and weighting table 600. In the comment region 730, for example, as a comment of User-478, "I am examining projects for Tokyo Olympics in 2020. Do you have any good ideas?" is indicated. As a comment of User-126 with respect to the comment of User-478, "With portable terminal application capable of □, □ is able to access information of □ at each site." is indicated. As a comment of User-867, "□ may also be a good idea!?" is indicated.

Member information in the member field 720 may be the photograph of a face, a name, an ID, or the like for identifying an individual. However, an identifier (anonymizer) which is not able to identify a member may be assigned, without the photograph of a face, a name, an ID, or the like being made open to the public. Furthermore, a generated community and an identifier within the community may be informed only to each member, and may not be disclosed to other members. Communication of true feelings may become active by non-disclosure. Furthermore, in an exemplary embodiment, a user automatically becomes a member of a community, and therefore, becoming the member may be against the intention of the user.

Obviously, in accordance with a user operation, the photograph of a face, a name, an ID, or the like may be made open to the public.

In accordance with a user operation, leaving or entering an automatically generated community may be permitted for a member. Through an introduction or the like, more appropriate members may form a community.

Furthermore, an automatically generated community may be automatically archived or deleted. For example, when a community has had a role for information sharing for a certain period of time or when the community is changed from an activated state to an inactivated state, the community may be archived or deleted. Accordingly, unnecessary communities may be prevented from existing.

An archived community and sharing information of the community may be reproducible. For example, in the case where attributes used for generating a community are similar to each other, when a new community is generated, (discussed contents in) an archived community may be referred to. Accordingly, past knowledge may be reused.

Figure 8:
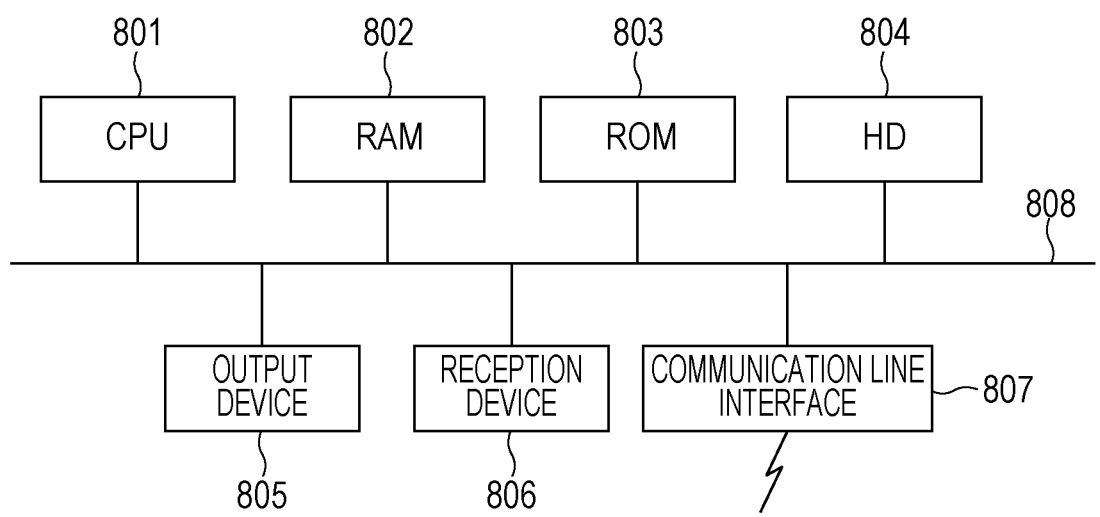
FIG. 8 is a block diagram illustrating an example of a hardware configuration of a computer which implements an exemplary embodiment.

A hardware configuration of a computer which executes a program according to an exemplary embodiment is, as illustrated in FIG. 8, a general computer, and specifically, a computer or the like which may serve as a personal computer or a server. That is, as a specific example, a CPU 801 is used as a processing unit (arithmetic unit), and a RAM 802, a read only memory (ROM) 803, and a hard disk (HD) 804 are used as a storing unit. For example, a hard disk or a solid state drive (SSD) may be used as the HD 804. The hardware configuration includes the CPU 801 which executes a program such as the profile collection and update module 120, the topic extraction module 130, the community generation and update module 140, the community use module 160, and the like, the RAM 802 which stores the program and data, the ROM 803 which stores a program or the like for activating the computer, the HD 804, which is an auxiliary storing unit (may be a flash memory or the like) which includes functions as the profile information management module 110 and the community information management module 150, a reception device 806 which receives data in accordance with an operation performed by a user to a keyboard, a mouse, a touch screen, a microphone, or the like, an output device 805 such as a cathode ray tube (CRT), a liquid crystal display, or a speaker, a communication line interface 807 for allowing connection with a communication network such as a network interface card, and a bus 808 for allowing data exchange among the above units. Multiple computers having the above configuration may be connected to one another via a network.

The foregoing exemplary embodiment that relates to a computer program is implemented by causing a system of the above hardware configuration to read the computer program, which is software, in cooperation of software and hardware resources.

The hardware configuration illustrated in FIG. 8 illustrates a configuration example. An exemplary embodiment is not limited to the configuration illustrated in FIG. 8 as long as a configuration which may execute modules explained in the exemplary embodiment is provided. For example, part of the modules may be configured as dedicated hardware (for example, an application specific integrated circuit (ASIC) or the like), part of the modules may be arranged in an external system in such a manner that they are connected via a communication line, or the system illustrated in FIG. 8 which is provided in plural may be connected via a communication line in such a manner that they operate in cooperation. Furthermore, in particular, part of the modules may be incorporated in a personal computer, a portable information communication device (including a mobile phone, a smart phone, a mobile device, and a wearable computer), an information electronic appliance, a robot, a copying machine, a facsimile machine, a scanner, a printer, or a multifunction apparatus (an image processing apparatus having two or more functions of a scanner, a printer, a copying machine, a facsimile machine, and the like).

Regarding comparison processing in the above description of the foregoing exemplary embodiment, those referred to as "not less than", "not more than", "larger than", or "smaller (less) than" may also be referred to as "larger than", "smaller (less) than", "not less than", or "not more than", respectively, unless no contradiction arises in combinations thereof.

The programs described above may be stored in a recording medium and provided or may be supplied through communication. In this case, for example, the program described above may be considered as an invention of "a computer-readable recording medium which records a program".

"A computer-readable recording medium which records a program" represents a computer-readable recording medium which records a program to be used for installation, execution, and distribution of the program.

A recording medium is, for example, a digital versatile disc (DVD), including "a DVD-R, a DVD-RW, a DVD-RAM, etc.", which are the standards set by a DVD forum, and "a DVD+R, a DVD+RW, etc.", which are the standards set by a DVD+RW, a compact disc (CD), including a read-only memory (CD-ROM), a CD recordable (CD-R), a CD rewritable (CD-RW), etc., a Blu-ray™ Disc, a magneto-optical disk (MO), a flexible disk (FD), a magnetic tape, a hard disk, a ROM, an electrically erasable programmable read-only memory (EEPROM™), a flash memory, a RAM, a secure digital (SD) memory card, or the like.

The entire or part of the above-mentioned program may be recorded in the above recording medium, to be stored and distributed. Furthermore, the program may be transmitted through communication, for example, a wired network or a wireless communication network used for a local area network (LAN), a metropolitan area network (MAN), a wide area network (WAN), the Internet, an intranet, an extranet, or the like, or a transmission medium of a combination of the above networks. Alternatively, the program or a part of the program may be delivered by carrier waves.

The above-mentioned program may be the entire or part of another program or may be recorded in a recording medium along with a separate program. Further, the program may be divided into multiple recording media and recorded. The program may be recorded in any format, such as compression or encryption, as long as the program may be reproduced.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
generate a group including a plurality of users; and
delete the group after a certain period of time passes since the group was generated; and
extract a common topic from profiles of a plurality of users, the profiles each include static information of a user and dynamic information of the user, the static information being fixed information and the dynamic information being variable information, wherein
a weight given to the static information is different from a weight given to the dynamic information.

2. An information processing apparatus comprising:
a processor configured to:
generate a group including a plurality of users; and archive the group after a certain period of time passes since the group was generated; and extract a common topic from profiles of a plurality of users, the profiles each include static information of a user and dynamic information of the user, the static information being fixed information and the dynamic information being variable information, wherein a weight given to the static information is different from a weight given to the dynamic information.

3. The information processing apparatus according to claim 2, wherein the processor is further configured to:

reproduce the archived group when a new group having an attribute used for the archived group.

* * * * *